United States Patent [19]

Hibbs, Jr. et al.

[11] 3,718,447
[45] Feb. 27, 1973

[54] GRINDING WHEELS FORMED FROM PRE-POLYMER COMPOSITIONS CONTAINING ALIPHATICALLY UNSATURATED IMIDO RADICALS

[75] Inventors: Louis E. Hibbs, Jr.; Fred F. Holub, both of Schenectady; Kenneth A. Darrow, Sprakers, all of N.Y.

[73] Assignee: General Electric Company, Schenectady, N.Y.

[22] Filed: Sept. 30, 1970

[21] Appl. No.: 77,000

[52] U.S. Cl. .................................. 51/295, 51/298
[51] Int. Cl. ......................... B24b 1/00, C08g 51/12
[58] Field of Search ............................ 51/295, 298

[56] References Cited

UNITED STATES PATENTS

| 3,385,684 | 5/1968 | Voter | 51/307 |
| 3,585,013 | 6/1971 | Bruschek | 51/295 |
| 3,383,191 | 5/1968 | Thomas | 51/298 |
| 3,295,940 | 1/1967 | Gerow | 51/298 |

Primary Examiner—Donald J. Arnold
Attorney—Richard R. Brainard, Paul A. Frank, John F. Ahern, Charles T. Watts, Leo I. MaLossi, Frank L. Neuhauser, Oscar B. Waddell and Joseph B. Forman

[57] ABSTRACT

A molding composition for the manufacture of resinoid bonded abrasive structures is described. Each molding composition employs a high temperature thermosetting pre-polymer (or mixture of organic materials) containing aliphatically unsaturated imido radicals, which cures with essentially no evolution of volatiles to produce polyimide resin cross-linked with carbon-to-carbon and/or carbon-to-nitrogen bonds. The preferred molding composition embodies (in addition to the aforementioned type of pre-polymer) quantities of abrasive particles; particles of a strong, high thermal conductivity filler and solid lubricant particles. Grinding wheel composite structures produced from these molding compositions are particularly effective for dry grinding.

7 Claims, No Drawings

GRINDING WHEELS FORMED FROM PRE-POLYMER COMPOSITIONS CONTAINING ALIPHATICALLY UNSATURATED IMIDO RADICALS

BACKGROUND OF THE INVENTION

The resin materials used most often in the preparation of resinoid bonded abrasive grinding wheels have been phenolic resins and, more recently, coalesced thermoplastic polyimide resins have filled an important need for the preparation of diamond abrasive wheels.

The thermal stability of thermoplastic polyimides is significantly greater than that of phenolic resins and the resin/abrasive bond for the thermoplastic polyimide system displays greater resilience and greater retention of strong bonding characteristics than is the case with the phenolic/abrasive system, particularly at temperatures in excess of 250° C.

The manufacture of grinding wheels by the coalescence of polyimide powder is referred to in U.S. Pat. No. 3,179,631 — Endrey. Such polyimide powder material may be of very high molecular weight, not from cross-linking, but due to the presence of long linear chains of the polyimide. Coalescence of this polyimide powder must occur at a temperature below the crystal melting temperature thereof and, therefore, wetting of the abrasive particles is very difficult. As pointed out in the Endrey patent (Endrey specification, column 3, lines 47–51) fabrication by conventional plastics forming techniques is impractical.

The equipment used for molding phenolic resins and the molding process is considerably less expensive than for coalescing the thermoplastic polyimides due to the significantly lower temperatures and pressures required in conventional molding. Also, the cost of the thermoplastic polyimide resin is considerably greater than that of phenolic resins.

The thermal stability and ease of processing of the resin used as the bonding medium in any abrasive grinding wheel play important roles in determining the degree of utilization and the performance of the wheel. The thermal stability of the resin is particularly important in the case of abrasives such as diamond and cubic boron nitride, which because of their high thermal conductivities rapidly transfer heat from the abrasive-workpiece interface to the grit/resin bond interface. When excessive heat reaches the resin, the resin degrades and reduces the bonding capability thereof whereby premature loss of abrasive grit results. Rubbing of the resin bond system against the workpiece generates frictional heat, which can also contribute to degradation of the wheel structure. Metal-cladding of the abrasive particles provides additional heat capacity and partially offsets these degrading mechanisms.

The problems attendant heat generation in the grinding system are much more severe in dry grinding than in wet grinding, therefore, the efficiency of performance in dry grinding operations is much lower than in wet grinding, particularly for tool and cutter applications.

It would, therefore, be particularly advantageous in the manufacture of grinding wheels to be able to utilize a thermosetting bonding medium that is less expensive both in material cost and processing cost than the thermoplastic polyimide and, which when cured will exhibit thermal stability approaching that of the coalesced thermoplastic polyimide.

Attempts have been made to minimize thermal degradation of the grinding wheel by introducing lubricants at the grinding wheel/workpiece interface, e.g. U.S. Pat. application, Ser. No. 729,395 — Mathewson et al. (now U.S. Pat. No. 3,528,789), filed May 15, 1968 (assigned to the assignee of the instant invention) and U.S. Pat. No. 3,502,453 — Baretto. Actual incorporation of the solid lubricant in a phenolic bonding grinding wheel has not been successful, in the sense that the wheel performance has not been improved significantly.

The development of an effective grinding wheel construction embodying a solid dry lubricant would be particularly useful, since it would provide an improved capability for dry grinding (as contrasted to wet grinding). With the advent of semi-automated and automated grinding machinery and processes, abrasive wheels which exhibit form stability and very low wear rates will become increasingly important.

SUMMARY OF THE INVENTION

The instant invention is in part directed to a molding composition for the manufacture of resin-bonded abrasive systems and in part to grinding wheel composite structures prepared therefrom. An essential constituent of these molding compositions is a resin, which makes available the manufacturing advantages of:

a. melting during processing to thoroughly wet the other constituents of the molding composition;
b. being substantially free of volatile emission during processing and curing and
c. curing thermally to provide a polymer cross-linked with carbon-to-carbon and/or carbon-to-nitrogen bonds.

This unique combination of properties is contributed to the molding composition by the use of a thermosetting pre-polymer (or mixture of organic materials) containing unsaturated imide moieties (as aliphatically unsaturated imido radicals) either with or without a small amount of free-radical initiator.

Grinding wheel composite structures produced from a preferred molding composition prepared according to this invention contain (in addition to the thermoset resin and abrasive particles) a quantity of strong, high thermal conductivity filler and solid dry lubricant. Both the filler and dry lubricant particles are pre-coated with polymer. These grinding wheel structures have been found to be very effective for dry grinding.

A pre-polymer is a resin composition in which polymerization has begun and has been interrupted before completion of the curing whereby curing can be completed on demand (this is analogous to a B-staged resin). The degree of polymerization is usually controlled to provide a material having desired processing characteristics, e.g. flowability, viscosity, etc. while at the same time having experienced a large percentage of the ultimate shrinkage encountered during complete cure.

DESCRIPTION OF THE PREFERRED EMBODIMENT

Thermosetting pre-polymers containing aliphatically unsaturated imido radicals may be prepared by various reactions described in French Pat. 1,555,564 granted Dec. 23, 1968; Netherlands Pat. 69.09.244 published Jan. 7, 1969; U.S. Pat. application, Ser. No. 819,445 — Holub et al filed Apr. 25, 1969 and U.S. Pat. application, Ser. No. 26,079 — Holub et al. filed Apr. 6, 1970. The aforementioned French and Netherlands patents and U.S. Pat. applications are incorporated by reference, each of the patent applications being assigned to the assignee of the instant invention.

Pre-polymer compositions and mixtures may be properly selected for the practice of this invention from those pre-polymer materials that may be prepared utilizing the reactions described in the aforementioned patents and U.S. Patent Applications providing that they display the properties set forth in either Group A or Group B:

GROUP A a. available as a fine powder that is solid at room temperature (23° C);
b. stable at room temperature;
c. having a melting point in the 150°–250° C range, the melting point being lower than the cure temperature thereof;
d. having a softening point in the 50°–150° C range (after the addition of a small amount of solvent, if necessary);
e. having a viscosity of at least 200 and less than about 25,000 centistokes at 135° C;
f. exhibiting a decrease in viscosity during the molding operation;
g. having a low vapor pressure in the liquid (molten) state;
h. thermally curable in the temperature range of about 170°–250° C without free radical initiator,
i. moldable at pressures up to 10,000 psi, the minimum pressure being sufficient to conform the resin to the mold configuration.

GROUP B a. available as a fine powder that is solid at room temperature (23° C);
b. stable at room temperature;
c. having a melting point below about 170° C and lower than the cure temperature thereof;
d. having a softening point in the 50°–150° C range (after the addition of a small amount of solvent, if necessary);
e. having a viscosity of at least 200 and less than about 25,000 centistokes at 135° C;
f. exhibiting a decrease in viscosity during the molding operation;
g. having a low vapor pressure in the liquid (molten) state;
h. thermally curable in the temperature range of about 170°–300° C without free radical initiator;
i. thermally curable in the temperature range of about 100°–170° C in the presence of a free radical initiator and
j. moldable at pressures up to 10,000 psi, the minimum pressure being sufficient to conform the resin to the mold configuration.

Exemplary pre-polymer materials are as follows:

1. the reaction product of N,N'-p,p'-diphenylmethane-bis-maleimide and p,p'-diaminodiphenylmethane [Example 4 of the aforementioned French patent];
2. the reaction product of N,N'-p,p'-diphenylmethane-bis-maleimide, p,p'-diaminodiphenyl methane and N-phenyl maleimide [Example 11 of Ser. No. 895,445 — Holub et al.];
3. the reaction product of N-phenyl maleimide, p,p'-diaminodiphenyl methane and N,N'-p,p'-diphenylmethane-bis-maleimide [page 47, line 6 et seq. of Ser. No. 819,445 — Holub et al.];
4. the reaction product of p,p'-methylene dianiline, aniline and maleic anhydride [Example 5 of Ser. No. 26,079 — Holub et al.];
5. the reaction product in the intercondensation of p,p'-methylenedianiline and maleic anhydride [Example 10 of Ser. No. 26,079 — Holub et al.];
6. the reaction product of p,p'-methylenedianiline, maleic anhydride and nadic anhydride [Example 11 of Ser. No. 26,079 — Holub et al.];
7. the reaction product of N,N'-p,p'-diphenylmethane-bis-maleimide (2½ moles) and p,p'-methylene dianiline (1 mole) [made by the process described in the aforementioned French patent] and
8. the reaction product of N-phenyl maleimide (4 moles), N,N'-p,p'-diphenylmethane-bis-maleimide (5 moles) and p,p'-methylene dianiline (2 moles) [made by the process described in Ser. No. 819,445 — Holub et al.].

Also, the preparation of polyimide pre-polymers is specifically described in the aforementioned Netherlands patent.

Thermal cure of pre-polymers selectable according to the criteria set forth in either Group A and Group B (without a free radical initiator) results in a cross-linking reaction involving unsaturated imides using oxygen from the ambient air and reaction sites within the pre-polymer and addition reactions forming carbon-to-nitrogen bonds. Thermal cure of the pre-polymers selectable according to the criteria set forth in Group B with a free radical initiator results in a cross-linking reaction using the free radicals introduced into the system by a quantity of an organic peroxide upon decomposition thereof.

In all instances the cross-linking is one between carbon atoms and/or between carbon and nitrogen atoms accomplished by an addition reaction which eliminates voids and keeps mold shrinkage to 0.002 in/in.

Organic peroxides such as dicumyl peroxide, benzoyl peroxide, tertiary butyl perbenzoate, azo-bis-isobutyronitrile, tertiary-alkyl peroxycarbonate, diperoxides (e.g. Vulcup R) etc. may be employed as the free radical initiators in concentrations ranging from about 0.01 percent up to about 5 percent by weight based on the weight of the pre-polymer employed.

The preferred pre-polymers for the practice of this invention are the reaction products 7 and 8 above. The property of all pre-polymers useful in the practice of this invention of passing through a state of very low viscosity during cure is of particular importance, because this phenomenon greatly enhances the ability of these bonding resins to wet and adhere to other materials in the molding system, e.g. fillers, abrasive grit, etc. during processing.

Another very useful inherent property of all pre-polymers employed in the practice of this invention for the preparation of grinding wheels used in wet grinding is the high resistance of the cross-linked polyimides to attack by conventional lubricants and coolants, particularly, hydrocarbons.

As has been noted hereinabove, abrasive grinding wheels have been prepared in the past both from thermoplastic linear polyimide materials and from phenolic resins. Phenolic resins generally require fillers to control material flow during fabrication, to modify properties (in some cases) and to keep shrinkage at an acceptable level.

In contrast to phenolic resins, thermoplastic polyimide material does not require filler material because of its strength, temperature resistance and lack of appreciable shrinkage during fabrication.

Since the thermosetting pre-polymers employed in the practice of this invention do not shrink appreciably during fabrication and are both strong and temperature resistant, it seemed feasible that the fabrication of dry grinding wheels would require no more than the addition of abrasive grit and solid lubricant to the pre-polymer and preparation of an abrasive wheel from this simple molding composition. However, it was found that a combination of ingredients properly prepared is necessary to produce a superior grinding wheel for dry grinding.

Thus, a wheel composed solely of the reaction product of N,N'-p,p'-diphenylmethane-bis-maleimide and p,p'-methylene dianiline, abrasive grains (cubic boron nitride) and solid lubricant (molybdenum disulfide) exhibited disappointing performance (Wheel No. 1 in Table I), when tested in the dry grinding of tool steel ($R_c$63–65).

Although significant improvements in dry grinding performance were made a) by employing metal coated cubic boron nitride in place of the uncoated cubic boron nitride abrasive grains (Wheel No. 2 in Table I); b) by providing the particles of molybdenum disulfide with a cured coating of the thermosetting polymer (Wheel No. 3 in Table I) or c) by utilizing polymer-coated silicon carbide particles rather than solid lubricant (Wheel No. 4 in Table I), the interesting development (see in Wheel No. 5) was that by incorporating a smaller amount of pre-coated solid lubricant (compared to Wheel No. 3) in combination with a smaller amount of pre-coated filler (compared to Wheel No. 4) together with metal-coated abrasive grains, the grinding performance jumped to over 1.5 times the best prior value.

Therefore, although theoretically it would appear that a filler should not be necessary in high temperature polyimide/abrasive systems, it has been found that in order to prepare a high performance grinding wheel for dry grinding using thermosetting unsaturated imides according to this invention the solid lubricant must be accompanied by a quantity of filler having particular properties and both the solid lubricant and the filler must be pre-coated with a suitable pre-polymer (then cured or partially cured) before incorporation in the molding composition.

The solid lubricant material may be selected from the sulfides, disulfides, selenides and tellurides of such metals as molybdenum, tungsten, titanium, zirconium, uranium, etc., which are characterized by a laminated or plate-like crystal structure. These compounds have excellent lubricating properties and also have excellent anti-seizing properties. Thus, the term "solid lubricant" or "dry lubricant" as employed herein is intended to include not only graphite and hexagonal boron nitride but those solid lubricants generically referred to as "lamellar metal compound lubricants." The range of dry lubricant content of the molding composition may vary from as little as about one-half to 1 percent to as much as 10 percent by volume, but the preferred range is from about 2 to 7½ volume per cent. The effect of the dry lubricant on grinding performance increases as the size of the pre-coated dry lubricant particles is decreased, probably because of the more uniform distribution of the particles and increased bond strength resulting therefrom.

Selection of suitable filler material in accordance with criteria set forth below is relatively straight-forward. Thus, the filler material must a) be chemically inert (to minimize "loading" of the grinding wheel), b) have a value of thermal conductivity of greater than 0.1 gm-cal/(sec)(cm$^{-3}$)° C, c) be available in a grain size passing through a 250 mesh screen (U.S. sieve) and d) be reasonably inexpensive.

Alumina has too low a thermal conductivity to be used in this system. Silicon carbide is the preferred filler, however, tungsten carbide, other refractory carbides, or borides, and metals, which meet the criteria set forth above may be used.

Metal-coated cubic boron nitride and metal-coated diamond are the preferred abrasives for dry grinding, but other conventional abrasives may be used for wet grinding. In addition to the cubic form of boron nitride another crystalline structure of boron nitride is the "wurtzite" form. This hard crystalline material should also be useful as the abrasive constituent.

The relative dry grinding performance of grinding wheels prepared from various molding compositions embodying N,N'-p,p'-diphenylmethane-bis-maleimide as the thermosetting resin are set forth in Table I below. As may be seen in Table I, various modifications (Wheel Numbers 6, 7 and 10) may be employed to optimize the basic successful dry grinding composition (Wheel No. 5) of thermosetting pre-polymer containing aliphatically unsaturated imide radicals, metal-coated abrasive grains, polymer-coated lubricant particles and polymer-coated filler particles.

In Table I the following conditions, abbreviations and materials apply:
 a. grinding ratio is the ratio of the volume of workpiece removed to the volume of wheel wear
 b. post cure temperature ... 250° C
 c. resin 1 ... the cured reaction product of N,N'-p,p'-diphenylmethane-bis-maleimide (2½ moles) and p,p'-methylene dianiline (1 mole)
 d. resin 2 ... N,N'-p,p'-diphenylmethane-bis-maleimide for pre-coating
 e. resin 3 ... phenol-formaldehyde resin for pre-coating
 f. resin 4 ... polysiloxane imide (a high temperature thermoplastic resin) for pre-coating
 g. M2 tool steel ... workpiece having $R_c$63–65 hardness (both lot A and lot B)
 h. SiC ... powder size FFF
 i. T-MoS$_2$ ... technical grade, about 80 mesh j. M-MoS$_2$ ... microsize (much finer than 80 mesh), available commercially as Molykote by Alpha Molykote Corporation k. Hex. BN ... hexagonal boron nitride, very fine particle size l. CBN ... cubic boron nitride grit m. Borazon II ... nickel-clad CBN made up of 40 weight percent (w/o) CBN and 60 w/o nickel; 120–140 mesh n. p/c ... pre-coated (resin applied, then cured)

Actual testing was done with cup wheels (1 inch O.D. × 0.75 I.D.) operating at a relative surface speed of 6000 ft/min, table speed of 6 ft/min and infeeds ranging from 0.0005 to 0.002 inch. These small wheels were used for reasons of economy and the results obtained from the actual dry grinding tests were correlated with a dry grinding test procedure employing 3¾ inches diameter flaring cup wheels, a relative surface speed of 4000 ft/min, table speed of 6 ft/min and a standard infeed of 0.001. All tests were performed on M2 tool steel. The aforementioned correlation was obtained on the basis of curves graphically relating specific tests with small and large wheels of the same composition. Thus, the grinding ratios displayed in the table are in terms of what is to be expected of 3¾ inches diameter cup wheels made under the conditions set forth above using the same compositions as those tested.

Prior to addition of the abrasive, the molding composition was in the form of a powder mixture tending to cling together.

Mixing was done by hand in a small porcelain dish using a porcelain pestle to crush any lumps and attain a reasonably homogeneous composition.

When the filler and lubricant were encapsulated (coated with cured polymer), this encapsulation was done prior to the mixing described above. This pre-coating was done by loosely mixing weighed amounts of pre-polymer and the material to be coated in a porcelain dish and placing the mixture in an oven at 110°–115° C for 15 minutes. This temperature was sufficient to melt, but not polymerize the pre-polymer. The dish was then removed from the oven, and when cooled, the mixture, which had been weakly sintered by this treatment, was crushed, re-mixed and the process repeated. After the heating, cooling, crushing and re-mixing had been conducted twice, the dish containing the polymercoated particulate material was placed in an oven at 250° C for 15 minutes to cure the resin coating thereon. The material was allowed to cool and was then once again broken up with a small spatula and porcelain pestle into a free-flowing powder.

As a substitute method the pre-polymer for the particle coating may be dissolved in a volatile solvent, such

TABLE I

| Grinding wheel No. | Composition (volume percent) | | Cure temp., °C | Post cure, hrs. | M2 tool steel | Grinding ratio | Remarks |
|---|---|---|---|---|---|---|---|
| 1 | CBN | 25.00 | 260 | 2.5 | A | 90 | Abrasive grains pulled out indicating poor bond between abrasive and resin; weak system. |
| | Resin 1 | 40.00 | | | | | |
| | T-MoS$_2$ | 35.00 | | | | | |
| 2 | Borazon II (25 CBN plus 14.75 Ni) | 39.75 | 260 | 2.5 | A | 170 | Had excessive abrasive grain pullout (whole coated particle); still weak system. |
| | Resin 1 | 40.00 | | | | | |
| | T-MoS$_2$ | 20.25 | | | | | |
| 3 | Borazon II | 39.75 | 260 | 2.5 | A | 370 | Reduced pullout of abrasive grains indicating better grain/resin bond. |
| | Resin 1 | 40.00 | | | | | |
| | T-MoS$_2$ (p/c with Resin 1) | 20.25 | | | | | |
| 4 | Borazon II | 39.75 | 165 | 2.5 | B | 380 | Greater reduction in abrasive grain pullout, but degradation of bond system occurred due to overheating. |
| | Resin 1 | 40.00 | | | | | |
| | SiC (p/c with Resin 1) | 20.25 | | | | | |
| 5 | Borazon II | 39.75 | 165 | 2.5 | B | 610 | Stronger system with adequate lubrication, giving low interfacial temperatures; better retention of abrasive grains and improved thermal conductivity |
| | Resin 1 | 40.00 | | | | | |
| | SiC (p/c with Resin 1) | 15.25 | | | | | |
| | T-MoS$_2$ (p/c with Resin 1) | 5.00 | | | | | |
| 6 | Borazon II | 39.75 | 165 | 2.5 | B | 690 | Better lubricant distribution in bond system due to smaller size of lubricant particles. |
| | Resin 1 | 40.00 | | | | | |
| | SiC (p/c with Resin 1) | 15.25 | | | | | |
| | M-MoS$_2$ (p/c with Resin 1) | 5.00 | | | | | |
| 7 | Borazon II | 39.75 | 165 | 2.5 | B | 720 | Better lubricant distribution due to smaller size gave better strength system; some gain from improved precoating of MoS$_2$ with lower viscosity material. |
| | Resin 1 | 36.00 | | | | | |
| | Resin 2 (as precoat for MoS$_2$) | 4.00 | | | | | |
| | SiC (p/c with Resin 1) | 15.25 | | | | | |
| | M-MoS$_2$ (p/c with Resin 2) | 5.00 | | | | | |
| 8 | Borazon II | 39.75 | 165 | None | B | 150 | Shows (compared to Ex. 3) the results from using precoating polymer having poor thermal properties. |
| | Resin 1 | 37.75 | | | | | |
| | Resin 3 (as p/c for MoS$_2$) | 2.25 | | | | | |
| | T-MoS$_2$ (p/c with Resin 3) | 20.25 | | | | | |
| 9 | Borazon II | 39.75 | 165 | 2.5 | B | 600 | Shows the interchangeability of solid lubricants. |
| | Resin 1 | 40.00 | | | | | |
| | SiC (p/c with Resin 1) | 15.25 | | | | | |
| | Hex. BN (p/c with Resin 1) | 5.00 | | | | | |
| 10 | Borazon II | 39.75 | 165 | 2.5 | B | 800 | Do. |
| | Resin 1 | 40.00 | | | | | |
| | SiC (p/c with Resin 1) | 15.25 | | | | | |
| | Graphite (p/c with Resin 1) | 5.00 | | | | | |
| 11 | Borazon II | 39.75 | 260 | 2.5 | A | 220 | Thermoplastic material not mechanically compatible with system; tendency to flow too much at molding temperature. |
| | Resin 1 | 32.00 | | | | | |
| | Resin 4 | 8.00 | | | | | |
| | T-MoS$_2$ (p/c with Resin 4) | 20.25 | | | | | |

In preparing the test wheels for the tests set forth in Table I the procedure followed for mixing and molding each wheel was the same. Constituents (when present) were weighed and mixed in the following order with the preceding constituents:

1. filler particles
2. resin powder
3. dry lubricant particles and
4. abrasive particles.

as acetone, added to the solid particles, and then the solvent evaporated at a temperature slightly above ambient. When dry the resin is cured at 250° C in the same manner as in the previous description of polymer encapsulation.

During loading of the ingredients into the mold cavity for the preparation of the grinding wheel, care was taken to maintain the abrasive particles (which were much larger in size than the other particles) uniformly distributed in the powder mix. The mold was then placed in a press, a thermocouple inserted, the mold was closed and pressure raised thereon to about 5,000 psi. The mold and its contents under pressure were then heated to a desired value (165° or 260° C depending on the presence or absence of free-radical initiator).

A cure time of about 12 minutes was employed for all specimens at the cure temperature although this time is not critical. During the heating and curing operation the temperature was maintained at about 5000 psi. After curing, the hot mold was removed from the press to facilitate cooling.

In the dry grinding tests each wheel was first trued by using as a workpiece a specially prepared, diamond abrasive bar three-sixteenth inch wide × one-fourth inch high and about 1-inch long. Either a maleimide resin-bonded bar or vitreous bonded bar is satisfactory, each bar containing 25 volume percent (v/o) diamond grit (−400 mesh for the maleimide bonded bar and 40 mesh for the vitreous bonded bar).

The trueing operation left the grinding wheel surface very flat and smooth thereby requiring dressing of the wheel. The dressing operation consisted simply of forcing the smooth trued wheel surface into contact with a specimen of M2 tool steel until grinding sparks appeared. The infeed was then gradually increased to the desired value. This grinding was continued until visual examination indicated that the entire wheel surface had been opened up. Thereafter an additional 200–300 mils was ground (from the workpiece) to further condition the wheel prior to the starting of each actual grinding test.

Each grinding ratio was determined according to a specific routine. Because it is characteristic of grinding wheels prepared according to this invention that grinding performance improves with increased total metal removal up to a point at which the grinding ratio levels off, all grinding ratios were obtained from tests done after the wheel performance had reached its peak. The grinding ratio was determined by grinding each of a batch of four tool steel specimens. The grinding ratio was determined after the grinding of every fourth tool steel sample and thereafter the grinding ratios from each of several tests were averaged to arrive at each value reported in the table.

The encapsulating (pre-coating) material for the filler and for the solid lubricant should be a thermosetting resin the same as the pre-polymer of the bonding resin or a different unsaturated polyimide having a viscosity the same as or less than the viscosity of the bonding resin. If different polyimides are used as the bonding resin and resin for pre-coating the filler and/or the solid lubricant, the pre-coating polyimide should be compatible with the bonding resin and (if a free-radical initiator is used) this polyimide and the bonding resin pre-polymer must react similarly to the same organic peroxide, if the pre-coated polyimide is not completely cured during encapsulation.

Two different curing temperatures (260° and 165° C) were employed in the preparation of the test wheels for Table I using this particular pre-polymer (Resin 1). Curing at the lower temperature was made possible by the introduction of 1–2 percent dicumyl peroxide (by weight of Resin 1) as the free-radical initiator. The dicumyl peroxide was added to the resin (pre-polymer) powder by milling.

Although there did not appear to be any difference in the physical or thermal properties in the resins cured at the different temperatures, curing at the lower temperature enables molding the high temperature polyimide under conditions similar to those used for processing phenolic resins in conventional molding equipment making it possible for grinding wheel manufacturers, who are now equipped to mold phenolic resin bonded grinding wheels, to utilize existing equipment to handle the thermosetting polyimides employed in the instant invention.

Although the typical post cure time employed was 2½ hours, performance has been found to significantly improve with increased post cure of the resin system. Thus, curing times may extend to in excess of 25 hours, if desired. Longer post cure times improve the hardness and impact strength of the wheel.

Grinding wheels prepared according to the teachings of this invention may have compositions in which the constituents as defined herein will be present in quantities (expressed as volume per cent) in the ranges shown below:

| | |
|---|---|
| Abrasive grit | 6–25% |
| Resin | 30–50% |
| Filler material | 7–25% |
| Solid lubricant | ½–10% |

When metal-coated abrasive grit is employed the ranges (volume percent) should be as follows:

| | |
|---|---|
| Abrasive grit | 8–40% |
| Resin | 30–50% |
| Filler material | 7–25% |
| Solid lubricant | ½–10% |

Each heat-curable organic composition useful for providing the cross-linked resin bond for an abrasive system in accordance with this invention will contain molecules having at least one aliphatically unsaturated imido group represented by the formula:

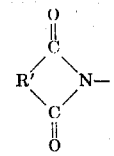

wherein R' is a member of the class consisting of

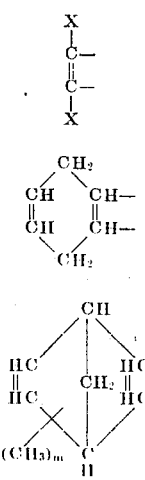

groupings and X is a member of the class consisting of hydrogen, halogen, and the methyl radical, and m is 0 or 1. These materials are more completely described in the aforementioned Ser. No. 819,445.

The heat-curable composition may be a pre-polymer, a mixture of pre-polymers, a pre-polymer plus one or more mono-imides, one or more bis-imides or a mixture of one or more bis-imides and one or more mono-imides.

What we claim as new and desire to secure by Letters Patent of the United States is:

1. A composition for molding abrasive articles comprising a pre-polymer of a heat-curable organic composition containing molecules having at least one aliphatically unsaturated imido group per molecule, said imido group being represented by the formula:

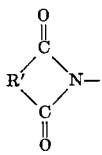

wherein R' is a member of the class consisting of

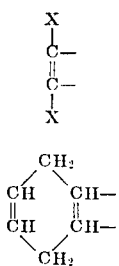

and

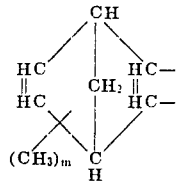

groupings and X is a member of the class consisting of hydrogen, halogen, and the methyl radical, and m is 0 or 1, abrasive grit, solid lubricant particles coated with cross-linked polyimide, resin, and finely divided particles of chemically inert filler having a value of thermal conductivity greater than 0.1 gm-cal/(sec)(cm$^{-3}$)°C, said filler particles being coated with cross-linked polyimide resin.

2. The molding composition of claim 1 having a small quantity of an organic peroxide included therewith.

3. The molding composition of claim 1 wherein the pre-polymer is the reaction product of N,N'-p,p'-diphenylmethane-bis-maleimide and p,p'-methylene dianiline.

4. The molding composition of claim 1 wherein the solid lubricant is molybdenum disulfide and the filler is silicon carbide of grain size passing through a 250 mesh screen (U.S. sieve).

5. The molding composition of claim 1 wherein the heat-curable pre-polymer is the reaction product of a bis-imide and a diamine.

6. The molding composition of claim 1 wherein the pre-polymer heat-curable organic composition is a mixture of imido monomers.

7. The molding composition of claim 1 wherein the pre-polymer is the reaction product of N-phenyl maleimide, N,N'-p,p'-diphenylmethane-bis-maleimide and p,p'-methylene dianiline.

* * * * *